United States Patent [19]

Blue et al.

[11] Patent Number: 4,574,228
[45] Date of Patent: Mar. 4, 1986

[54] CURRENT CONTROLLED MOTOR DRIVE CIRCUIT

[75] Inventors: Larry A. Blue, Bahama; David E. Conner, Cary, both of N.C.

[73] Assignee: International Business Machines Corp., Armonk, N.Y.

[21] Appl. No.: 679,336

[22] Filed: Dec. 7, 1984

[51] Int. Cl.⁴ .............................................. H02P 8/00
[52] U.S. Cl. .................................... 318/696; 318/685
[58] Field of Search ............... 318/685, 696; 323/266, 323/282, 283; 363/124

[56] References Cited

U.S. PATENT DOCUMENTS 3,742,330  6/1973  Hodger et al. ...................... 323/266
4,431,955  2/1984  Faedi et al. ......................... 318/696

Primary Examiner—William M. Shoop, Jr.
Assistant Examiner—Saul M. Bergmann
Attorney, Agent, or Firm—Joscelyn G. Cockburn

[57] ABSTRACT

A switching regulator causes a supply voltage to be intermittently chopped to provide energy pulses in a lowpass filter circuit. The lowpass filter circuit includes a capacitor which is being charged by the chopped energy pulses and whose output is used to drive a low voltage stepper motor. The duty cycle of the energy pulses is a function of the average value of the stepper motor coil current. By correlating the duty cycle of the energy pulses with the average current in the motor coil a relatively high torque is provided to drive the motor during a startup phase and is automatically adjusted to meet the running requirements of the particular stepper motor.

9 Claims, 2 Drawing Figures

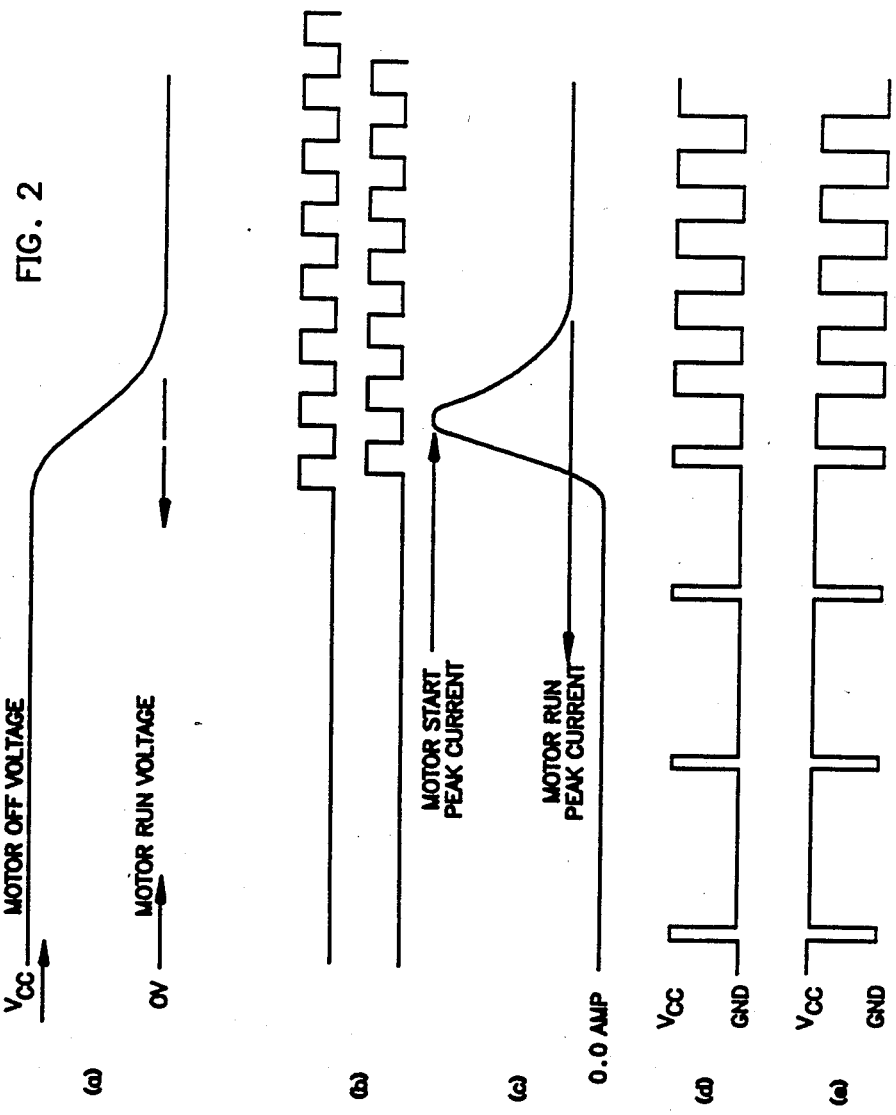

CURRENT CONTROLLED MOTOR DRIVE CIRCUIT

BACKGROUND OF THE INVENTION

1. Field of the Invention

The present invention relates to power supplies in general and more particularly to power supplies for energizing stepper motors.

2. Prior Art

The use of stepper motors to perform a variety of industrial tasks is on the increase. The typical stepper motor includes a plurality of independent windings which must be controlled in a predetermined sequence in order to produce an incremental step. The control signals are generated from a control means which accepts a series of command pulses and provides control signals for controlling the windings. The control signals force the motor to step a predetermined distance. The step is, essentially, produced simultaneously with the appearance of the pulse. In addition to the stepping pulses, each winding must be supplied with energizing current. The energizing current is usually provided from an adequate power supply.

Designing adequate power supplies has been a problem in the past. The problem stems from the fact that low voltage stepper motors require a relatively high starting torque and a relatively low running torque. Motor torque is directly related to the current flow in the motor windings. If the current flow is high, the torque is high and vice versa. One of the inherent characteristics of a low voltage stepper motor is that the coil inductance is relatively high which in turn limits the rise time of coil current. Since the natural characteristic of the coils, in the low voltage motor, limits fast current rise and the desired result is to maximize current flow in order to provide the high startup torque, the designer faces a dilemma of reconciling these conflicting requirements.

The problem is further augmented because in several applications the motor must respond within a relatively short time interval. However, friction and other motion opposing forces are initially large and a high startup torque is necessary to force the mechanical load into motion. Once started, the inertia of the load will reduce the motor torque requirement.

The prior art methods for solving the low startup torque problem can be broadly classified into two main circuit types, namely: chopper driver circuits and bi-level or pedestal driver circuits. Although both of these approaches work well for the intended purpose, they suffer from a common drawback, namely: a much higher voltage than the rated motor voltage is used to energize the motor. The high voltage causes the coil current to rise quickly thus increasing the startup torque.

Regarding the chopper drive circuit, it is designed to pulse a high voltage across the motor coil at a relatively high frequency (say, 20 kHz). During the pulse, the coil current rises rapidly and decreases slowly when the pulse ends.

As a result, a high startup torque is obtained with a relatively low DC current. In addition to the above-identified problem, these circuits suffer from high component count, noise at the switching frequencies and low efficiency due to switching losses in the motor and the active devices which form the circuit.

On the other hand, the pedestal or bilevel driver circuits apply a high voltage across the motor coil until the current reaches a predefined level whereupon the high voltage power supply is switched out of the circuit and a lower rated voltage supply is used to drive the coil. The major disadvantages with this type of circuit are the requirement for at least two power supplies, noise isolation between the supplies, protection required when the power supplies are switched and low efficiency.

The above-described circuits and other types of circuits aimed at solving the high startup torque problems are given in the following prior art patents: U.S. Pat. No. 4,295,083; 3,967,179; 3,809,991; 4,353,021; 4,208,868; and U.K. Pat. No. 1,579,121.

SUMMARY OF THE INVENTION

It is therefore the main object of the present invention to provide a more efficient power supply for driving low voltage stepper motors.

It is another object of the present invention to use a single low level voltage supply to provide a relatively high startup current by supplying a relatively large initial voltage across the motor coil and upon inducing motion in the motor reduce the coil current to the level required to keep the motor moving.

The circuit arrangement includes a low voltage power supply and a regulating circuit connected thereto. The combination supplies a maximum available voltage to the motor when it is at rest. The coil current is monitored and when it rises above a threshold, the regulating circuit reduces the available voltage to the motor until the coil current falls to the level required to maintain motor motion.

The circuit arrangement includes a switching transistor whose emitter is coupled to the low voltage power supply. An averaging filter, having a conductive coil (L1) and a capacitor (C1) is connected in series, coupled to the collector lead of the switching transistor. The stepper motor coils are connected across the capacitor. A device suitable for measuring the current through the motor coils and to generate a voltage signal representative of said current is coupled to the motor. The voltage signal is used to adjust the duty cycle of the output signal from a pulse width modulator (PWM) which is coupled to the base lead of the switching transistor. With this circuit configuration when the motor is at rest, the maximum supply voltage is impressed across the coils or windings. As the motor drivers are activated, maximum current flows through the windings. The voltage signal formed from the current flow adjusts the duty cycle of the signal outputted from the PWM until the input voltage to the motor is at a value suitable to sustain normal operation.

BRIEF DESCRIPTION OF THE DRAWINGS

FIG. 2 shows a set of graphs representative of the electrical signals appearing at different parts of the circuit in FIG. 1.

DETAILED DESCRIPTION OF THE PREFERRED EMBODIMENT

Figure 1:
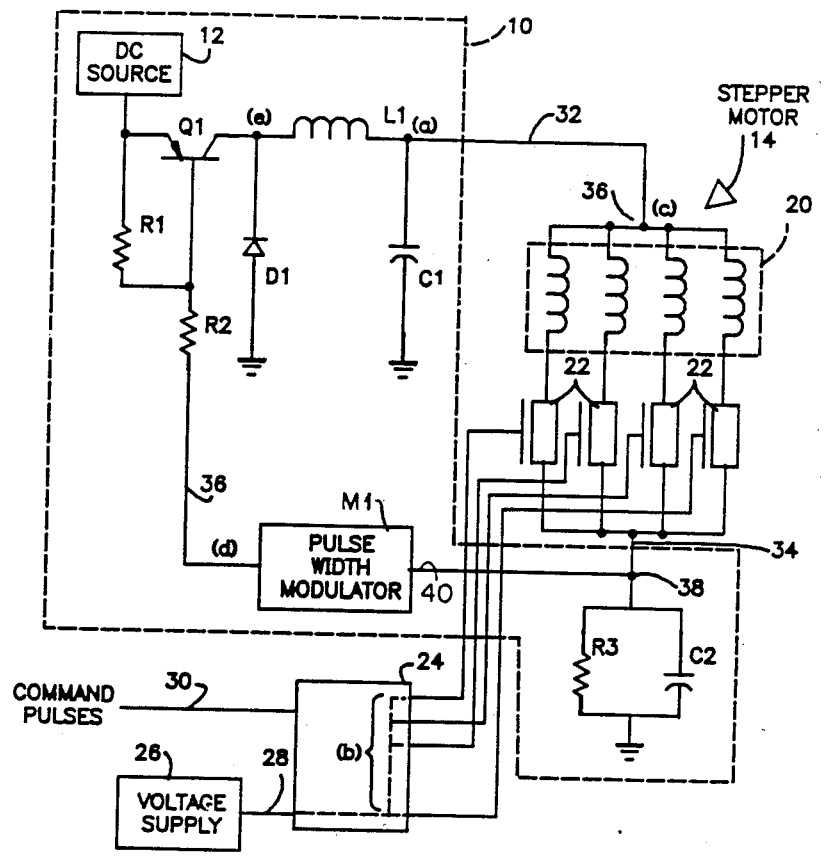
FIG. 1 shows a schematic of the regulator circuit of the present invention driving a stepper motor.

Referring to FIG. 1, the power supply according to the teaching of the present invention is generally indicated by numeral 10. The power supply further includes a regulating circuit arrangement (to be described hereinafter) which controls energy from a DC source 12 to a stepper motor 14. The stepper motor includes a plurality of individual coils identified by numeral 20. Each coil is coupled through individual FET device 22 to a motor control means 24. A current supply source 26 supplies current over leads 28 to the motor control leads. Command pulses are supplied from an outside source over lead 30 to the motor control means 24. The use of a motor control means such as 24 for modulating current in response to command pulses supplied thereto and to activate motor drivers such as the FET's 22 so that current flows through the selected coil to move the motor an incremental distance is well known in the prior art. Therefore, a detailed description of these devices will not be given. Suffice it to say that in order for the stepper motor 14 to move an incremental distance a command pulse is presented on conductor 30. The motor control means 24 uses the pulse to modulate current supplied on lead 28 and as a result one or more of the FET devices are activated and current flows through the selected coil to step the motor a desired distance. Once the motor is stepped, a holding current holds the motor in its newly-acquired position until another step is executed.

Still referring to FIG. 1, the stepper motor 14 is connected by leads 32 and 34 to the power supply 10. Lead 32 supplies an input voltage to input node 36 of stepper motor 14. To this end lead 32 is tied to the positive plate 37 of a capacitor C1. The negative plate of C1 is tied to ground. As will be explained subsequently, the voltage which is supplied to stepper motor 14 is essentially the voltage across C1. This voltage is adjusted so that when the motor is at rest (i.e., stationary) a very high voltage operable to provide a very high starting torque is applied across the windings of the motor. As the motor rotor begins to move and the friction and other forces decrease, the voltage on C1 is adjusted until the voltage across the winding is essentially that which is needed or necessary to keep the motor in motion.

The capacitor C1 is connected to coil L1 which is connected to the collector lead of a switching transistor Q1. The serial combination of L1 and C1 forms an inductive input averaging filter whose output on lead 32 represents the average value of a chopped input signal outputted from Q1. A diode D1 is connected between ground and the collector lead of Q1. The diode is poled so that it provides a path for the inductor current when switch Q1 is in a non-conducting state (that is, turned-off). The base lead of switching transistor Q1 is tied through resistor R2 to the output of a pulse width modulator M1. Similarly, the emitter of switching transistor Q1 is connected to DC source 12. A resistor R1 is connected between the emitter lead and the base lead of switching transistor Q1. Resistor R1 provides a path for Q1 base leakage current, and defines the "off" VBE voltage.

Similarly, resistor R2 is used to limit the Q1 base drive current. M1 is a pulse width modulator whose function it is to provide a variable duty cycle output signal on lead 36 that is porportional to an error signal generated at node 38 and is supplied on conductor 40 to the input of said pulse width modulator. The error voltage at node 38 is generated by the R3 C2 filter which interconnects node 38 to ground potential. The error signal is representative of the average current through the motor coils. The values of R3 and C2 are chosen so that with nominal current flowing through the windings of the motor the error voltage signal that is applied via conductor 40 to the pulse width modulator is such that the correct operating potential is applied on lead 32 to the motor.

It should be noted that although the stepper motor 14 shows four energization coils this should not be construed as a limitation on the scope of this invention since the present invention can be used with any motor having fewer or more than four energization coils. Also, Table I gives a listing of values for various components used in FIG. 1. Again, this listing is only representative of the components used and does not intend to limit this invention in any way. Except for the numeral (SG3524), the listing is self-explanatory and a detailed description is not necessary. The numeral (SG3524) identifies an off-the-shelf Pulse Width Modulator Module.

TABLE I

| COMPONENTS | REPRESENTATIVE VALUES AND/OR DESCRIPTION |
|---|---|
| Q1 | NPN Transistor |
| D1 | Diode |
| R1 | 6k ohms |
| R2 | 1.3k ohms |
| M1 | Pulse Width Modulator (SG3524) |
| R3 | 2.6 ohms |
| L1 | 300 $\mu$h |
| C1 | 470 $\mu$f |
| C2 | 100 $\mu$f |

FIG. 2 shows a set of graphs which are generated at different zones in the circuit arrangement of FIG. 1. In order to simplify the description of FIG. 2, each graph is identified alphabetically. The same letter is used in FIG. 1 to identify the zone whereat the particular graph is generated. To this end, graph A shows the voltage waveform which is outputted from capacitor C1 and is applied to the stepper motor 14. It should be noted that when the motor is at rest the total supply voltage ($V_{cc}$) which is outputted from DC source 12 is impressed across the winding of the motor. As the motor begins to move, the voltage decreases from $V_{cc}$ to some normal operating voltage. As the motor is brought to rest, the voltage across the motor ramps back up to $V_{cc}$.

Graph B shows the stepper motor drive pulses which are generated and outputted from motor control means 24. Graph C shows the average stepper motor load current which is supplied to windings 20 of stepper motor 14. It should be noted that the largest amount of current is supplied when the motor initially starts from rest and decreases as the rotor of the motor continues to move. Graph D shows an output signal from the pulse width modulator while Graph E shows the signal outputted from switching transistor Q1.

OPERATION

With the stepper motor at rest the stepper motor drivers 22 are off and no current flows in sense resistor R3. With no current flow in R3, sense voltage input on conductor 40 to pulse width modulator M1 is zero. In this condition, the output from the pulse width modulator M1 is at its minimum duty cycle and it drives transistor Q1 into saturation. With no load current permitted to flow, the output filter capacitor C1 is charged to an approximate value of the input supplied voltage $V_{cc}$. When the stepper motor drivers 22 are turned on by motor control means 24, the motor coils 22 current will increase very rapidly because of the high voltage (approximately $V_{cc}$) being impressed across the coils. As the stepper motor coil current increases, the pulse width modulator M1 begins to increase the duty cycle with which transistor Q1 is driven. As the duty cycle increases, the voltage at the output of the L1 C1 filter decreases. This continues until a steady state condition is reached when the voltage across sense resistor R3 is sufficient to generate a duty cycle at the output of the pulse width modulator M1 which results in an output voltage across C1 that will maintain the desired motor current. It should be noted that the time constant of resistor R3 and capacitor C2 should be so chosen that the sense voltage fed to the input of the pulse width modulator will represent the average value of the stepper motor coil current.

It should be noted that the above described invention can be used for any type of electromechanical devices where a high startup energy is needed. Such electromechanical devices may include rotary solenoid, magnetic actuators, etc.

While the invention has been particularly shown and described with reference to the preferred embodiments thereof, it will be understood by those skilled in the art that various changes in form and details may be made therein without departing from the spirit and scope of the invention.

Having thus described our invention what we claim as new and desire to secure as Letters Patents is as follows:

1. A circuit arrangement for driving a motor comprising:
   first means operable for generating a DC voltage signal;
   a chopper circuit means operable for correlating the voltage signal with an input drive signal and to output a modified DC voltage signal whose on-to-off time ratio is being dictated by a duty cycle of the input drive signal;
   a filtering means operable for averaging the modified DC voltage signal and for supplying the averaged voltage signal to the motor;
   a second means coupled to said motor and operable for monitoring current flow therethrough and for providing an error signal representative of said current; and
   a third means responsive to the error signal and operable to generate and output the input drive signal whose duty cycle is being controlled by the error signal.

2. The circuit arrangement of claim 1 wherein the error signal generated by the second means represents the average value of current flowing in the windings of said motor.

3. A circuit arrangement for driving a motor comprising:
   first means operable for generating a DC voltage signal;
   a chopper circuit means, including a switching transistor, a diode being connected to the collector lead of said transistor a first resistor being connected to the base lead and a second resistor interconnecting the emitter lead to the base lead, with said chopper circuit means being operable for correlating the voltage signal with an input drive signal and to output a modified DC voltage signal whose on-to-off time ratio is being dictated by a duty cycle of the input drive signal;
   a filtering means operable for averaging the modified DC voltage signal and for supplying the averaged voltage signal to the motor;
   a second means coupled to said motor and operable for monitoring current flow therethrough and for providing an error signal representative of the average value of said current; and
   a third means responsive to the error signal and operable to generate and output the input drive signal whose duty cycle is being controlled by the error signal.

4. The circuit arrangement of claim 1 wherein the filtering means includes an inductive coil being connected in series with a capacitor.

5. The circuit arrangement of claim 1 wherein the second means includes integrating means for integrating the current through the windings.

6. The circuit arrangement of claim 5 wherein the integrating means includes a resistive means connected in parallel with a capacitor.

7. The circuit arrangement of claim 1 wherein the third means includes a pulse width modulator.

8. An improved circuit arrangement for adjusting the volage generated from a power supply and providing a controlled signal for energizing the coils of a stepper motor, said improved circuit arrangement comprising;
   first means for monitoring current flowing through the coils and for generating a signal representative of said current;
   second means responsive to said signal and operable for generating a second signal with variable duty cycle;
   chopper circuit means connected to the power supply and operable for correlating the signal outputted from said power supply with the second signal to provide a chopped DC voltage signal whose on-off time ratio is being dictated by the second signal with variable duty cycle; and
   means operable for processing the chopped DC voltage signal and to store an adjustable charge operable for supplying a high torque for initiating motion in said motor and for supplying a lower torque when motion is being established in said motor.

9. A circuit arrangement for driving a motor comprising:
   first means operable for generating a DC voltage signal;
   a chopper circuit means operable for correlating the voltage signal with an input drive signal and to output a modified DC voltage signal;
   a filtering means operable for averaging the modified DC voltage signal and for supplying the averaged voltage signal to the motor;
   a second means coupled to said motor and operable for monitoring current flow therethrough and for providing an error signal representative of said current; and
   a third means responsive to the error signal and operable to generate and output the input drive signal.

* * * * *